US011912123B2

(12) United States Patent
Kuo et al.

(10) Patent No.: US 11,912,123 B2
(45) Date of Patent: Feb. 27, 2024

(54) TRACTION BATTERY PACK VENTING SYSTEM AND VENTING METHOD

(71) Applicant: Ford Global Technologies, LLC, Dearborn, MI (US)

(72) Inventors: Chung-Hsing Kuo, Ann Arbor, MI (US); Yongcai Wang, Ann Arbor, MI (US); LeeAnn Wang, Canton, MI (US); Che-chun Chang, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 233 days.

(21) Appl. No.: 17/545,474

(22) Filed: Dec. 8, 2021

(65) Prior Publication Data

US 2023/0173901 A1    Jun. 8, 2023

(51) Int. Cl.
*B60K 1/04* (2019.01)
*H01M 50/209* (2021.01)
*H01M 50/289* (2021.01)
*H01M 50/317* (2021.01)

(52) U.S. Cl.
CPC ............. *B60K 1/04* (2013.01); *H01M 50/209* (2021.01); *H01M 50/289* (2021.01); *H01M 50/317* (2021.01); *B60K 2001/0438* (2013.01); *H01M 2220/20* (2013.01)

(58) Field of Classification Search
CPC ............. B60K 1/04; B60K 2001/0438; H01M 50/209; H01M 50/289; H01M 220/20; H01M 50/317
See application file for complete search history.

(56) References Cited

U.S. PATENT DOCUMENTS

| 6,227,322 | B1 * | 5/2001 | Nishikawa | B60R 16/04 180/68.5 |
| 6,635,380 | B1 * | 10/2003 | Shimoda | H01M 50/26 429/93 |
| 2009/0116257 | A1 * | 5/2009 | Rosemeyer | B60Q 1/2611 250/504 R |
| 2011/0159326 | A1 * | 6/2011 | Oya | B60L 50/50 429/82 |

(Continued)

FOREIGN PATENT DOCUMENTS

| DE | 102014213916 A1 | 1/2016 |
| DE | 102020001540 A1 | 9/2021 |

*Primary Examiner* — Jason D Shanske
*Assistant Examiner* — James J Triggs
(74) *Attorney, Agent, or Firm* — David B. Kelley; Carlson, Gaskey & Olds, P.C.

(57) ABSTRACT

A traction battery pack venting system includes a plurality of battery arrays within a traction battery pack. The battery arrays each have a plurality of individual battery cells. The system further includes a divider system that provides a plurality of vented gas receiving compartments. Each of the vented gas receiving compartments are separate and distinct from the other vented gas receiving compartments within the plurality of vented gas receiving compartments. Each of the vented gas receiving compartments are associated with one of the battery arrays. Each of the vented gas receiving compartments can be associated with a manifold. The vent gas produced from thermal runaway can be discharged to the vented gas receiving compartments, directed to a manifold, and discharge to the external atmosphere.

19 Claims, 3 Drawing Sheets

(56) References Cited

U.S. PATENT DOCUMENTS

| | | | |
|---|---|---|---|
| 2013/0330579 A1* | 12/2013 | Ejiri | H01M 50/30 429/53 |
| 2015/0144409 A1* | 5/2015 | Fujii | H01M 50/519 429/121 |
| 2016/0218336 A1 | 7/2016 | Herrmann et al. | |
| 2018/0337374 A1* | 11/2018 | Matecki | B60K 1/04 |
| 2020/0152941 A1 | 5/2020 | Wynn et al. | |
| 2021/0028424 A1* | 1/2021 | Schuessler | H01M 50/3425 |

\* cited by examiner

TRACTION BATTERY PACK VENTING SYSTEM AND VENTING METHOD

TECHNICAL FIELD

This disclosure relates generally to a traction battery pack and, in particular, to routing vented gas away from a traction battery pack.

BACKGROUND

Electrified vehicles differ from conventional motor vehicles because electrified vehicles can be selectively driven using one or more electric machines powered by a traction battery pack. The electric machines can drive the electrified vehicles instead of, or in addition to, an internal combustion engine. A traction battery pack of an electrified vehicle can include one or more battery arrays within an enclosure. The battery arrays each include a plurality of individual battery cells.

SUMMARY

In some aspects, the techniques described herein relate to a traction battery pack venting system, including: a plurality of battery arrays within a traction battery pack, the battery arrays each having a plurality of individual battery cells; and a divider system that provides a plurality of vented gas receiving compartments, each of the vented gas receiving compartments separate and distinct from the other vented gas receiving compartments within the plurality of vented gas receiving compartments, each of the vented gas receiving compartments associated with one of the battery arrays. (or partial of one array)

In some aspects, the techniques described herein relate to a traction battery pack venting system, wherein each of the battery arrays includes a pair of endplates that sandwich the plurality of individual battery cells of the respective battery array.

In some aspects, the techniques described herein relate to a traction battery pack venting system, wherein the divider system includes a plurality of non-structural walls.

In some aspects, the techniques described herein relate to a traction battery pack venting system, wherein the plurality of non-structural walls are mica.

In some aspects, the techniques described herein relate to a traction battery pack venting system, wherein the plurality of non-structural walls are arranged in a grid pattern.

In some aspects, the techniques described herein relate to a traction battery pack venting system, wherein the divider system includes a plurality of non-structural walls abutting a plurality of structural walls.

In some aspects, the techniques described herein relate to a traction battery pack venting system, wherein the plurality of structural walls are structural cross-members that extend from a driver side of the traction battery pack to a passenger side of the traction battery pack.

In some aspects, the techniques described herein relate to a traction battery pack venting system, further including an enclosure that houses the plurality of battery arrays and the divider system.

In some aspects, the techniques described herein relate to a traction battery pack venting system, further including a manifold that extends along a side of the enclosure, wherein at least some of the plurality of vented gas receiving compartments open to the manifold.

In some aspects, the techniques described herein relate to a traction battery pack venting system, further including a filtration insert contained within the manifold.

In some aspects, the techniques described herein relate to a traction battery pack venting system, wherein the manifold is a driver side manifold on a driver side of the enclosure, and further including a passenger side manifold on a passenger side of the enclosure, wherein the plurality of battery arrays includes a plurality of battery arrays on a driver side and a plurality of battery arrays on a passenger side, the driver side manifold configured to receive vented gas from the vented gas receiving compartments associated with the plurality of battery arrays on the driver side, the passenger side manifold configured to receive vented gas from the vented gas receiving compartments associated with the plurality of battery arrays on the passenger side.

In some aspects, the techniques described herein relate to a traction battery pack venting system, further including securing the passenger side manifold and the driver side manifold to rails of an electrified vehicle to secure the traction battery pack to the electrified vehicle.

In some aspects, the techniques described herein relate to a traction battery pack venting method, including: incorporating a divider system into a traction battery pack to provide a plurality of vented gas receiving compartments within the traction battery pack, each of the vented gas receiving compartments separate and distinct from the other vented gas receiving compartments within the plurality of vented gas receiving compartments, each of the vented gas receiving compartments associated with a battery array of the traction battery pack.

In some aspects, the techniques described herein relate to a traction battery pack venting method, wherein each of the battery arrays includes a pair of endplates that sandwich a plurality of individual battery cells of the respective battery array.

In some aspects, the techniques described herein relate to a traction battery pack venting method, wherein the divider system includes a plurality of non-structural walls abutting a plurality of structural walls.

In some aspects, the techniques described herein relate to a traction battery pack venting method, further including routing vented gas from the vented gas receiving compartments into a manifold that extends along a side of the traction battery pack.

In some aspects, the techniques described herein relate to a traction battery pack venting method, further including routing vented gas through a filtration insert held within the manifold.

In some aspects, the techniques described herein relate to a traction battery pack venting method, further including securing the traction battery pack to a vehicle through the manifold.

In some aspects, the techniques described herein relate to a traction battery pack venting method, further including routing vented gas from the vented gas receiving compartment through an opening in an enclosure of the traction battery pack.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Under some conditions, one or more battery cells of a traction battery pack can expel relatively high temperature gaseous byproducts. The gas byproducts can be expelled through vents of the battery cells as vented gases.

The vented gases can be relatively high temperature gases. During a venting event, thermal energy from the venting battery cells and the vented gases can propagate to neighboring battery arrays. This propagation of thermal energy can be undesirable.

This disclosure is directed toward directing vented gases from the battery pack in ways that can reduced thermal propagation to neighboring battery arrays.

Figure 1:
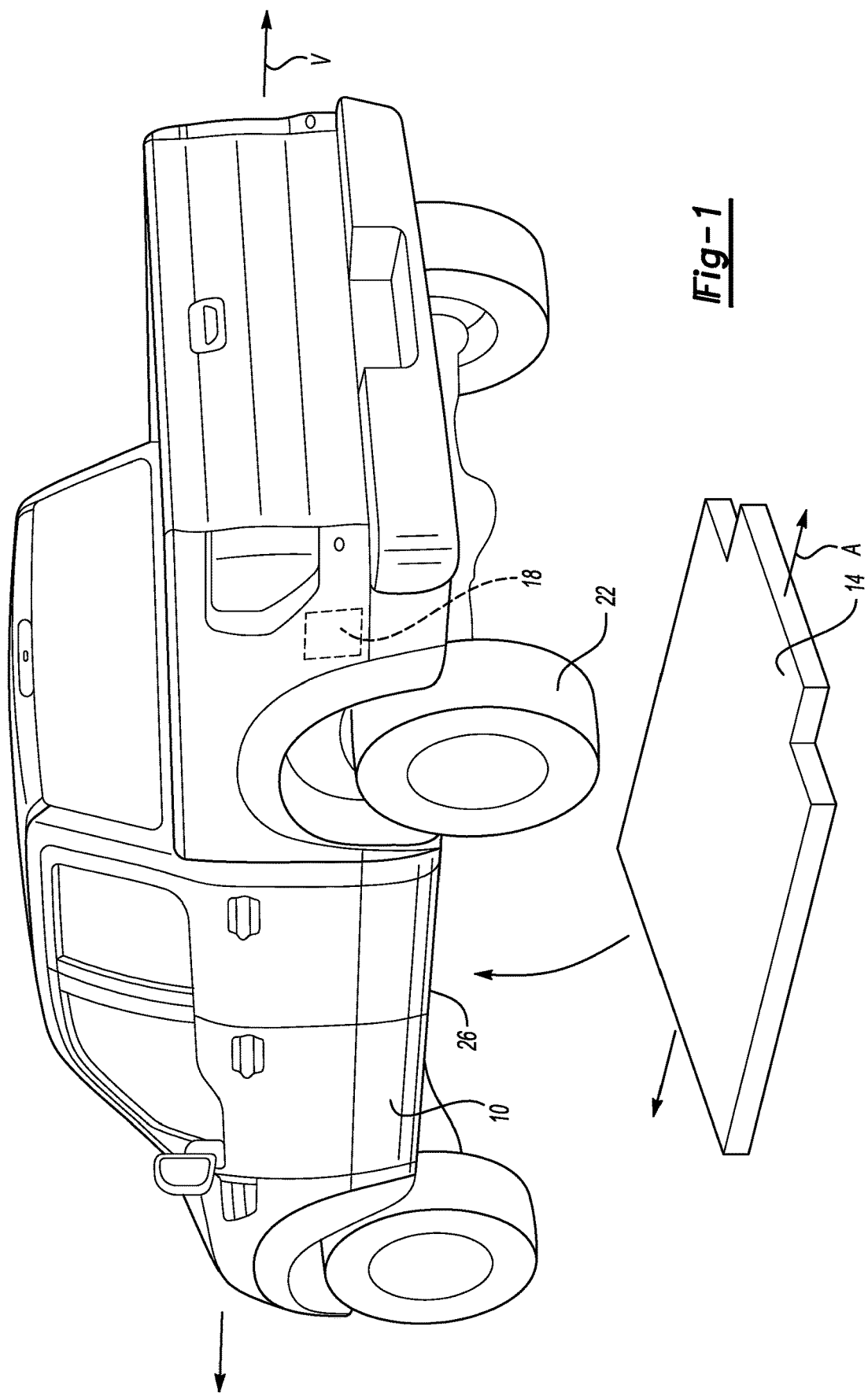
FIG. 1 illustrates a side view of an electrified vehicle having a traction battery pack.

With reference to FIG. 1, an electrified vehicle 10, in an exemplary non-limiting embodiment, includes a traction battery pack 14, at least one electric machine 18, and a plurality of wheels 22. The traction battery pack 14 can provide electrical power to the electric machine 18, which converts the electric power to torque to drive the wheels 22.

The traction battery pack 14 can be a relatively high-voltage battery. The traction battery pack 14 is considered a traction battery pack at least because electrical energy from the traction battery pack 14 can be used to propel the electrified vehicle 10.

The traction battery pack 14 is, in the exemplary embodiment, secured to an underbody 26 of the electrified vehicle 10. The traction battery pack 14 could be located elsewhere on the electrified vehicle 10 in other examples. The traction battery pack 14 can be secured to the underbody 26 utilizing mechanical fasteners that engage structural rails of the electrified vehicle 10, for example. When secured to the underbody 26, a longitudinal axis A of the traction battery pack 14 is substantially aligned with a longitudinal axis V of the electrified vehicle 10.

The electrified vehicle 10 is an all-electric vehicle. In other examples the electrified vehicle 10 is a hybrid electric vehicle, which electively drives wheels using torque provided by an internal combustion engine instead of, or in addition to, torque provided by an electric machine powered by a traction battery pack. Generally, the electrified vehicle 10 could be any type of vehicle having a traction battery pack.

Figure 2:
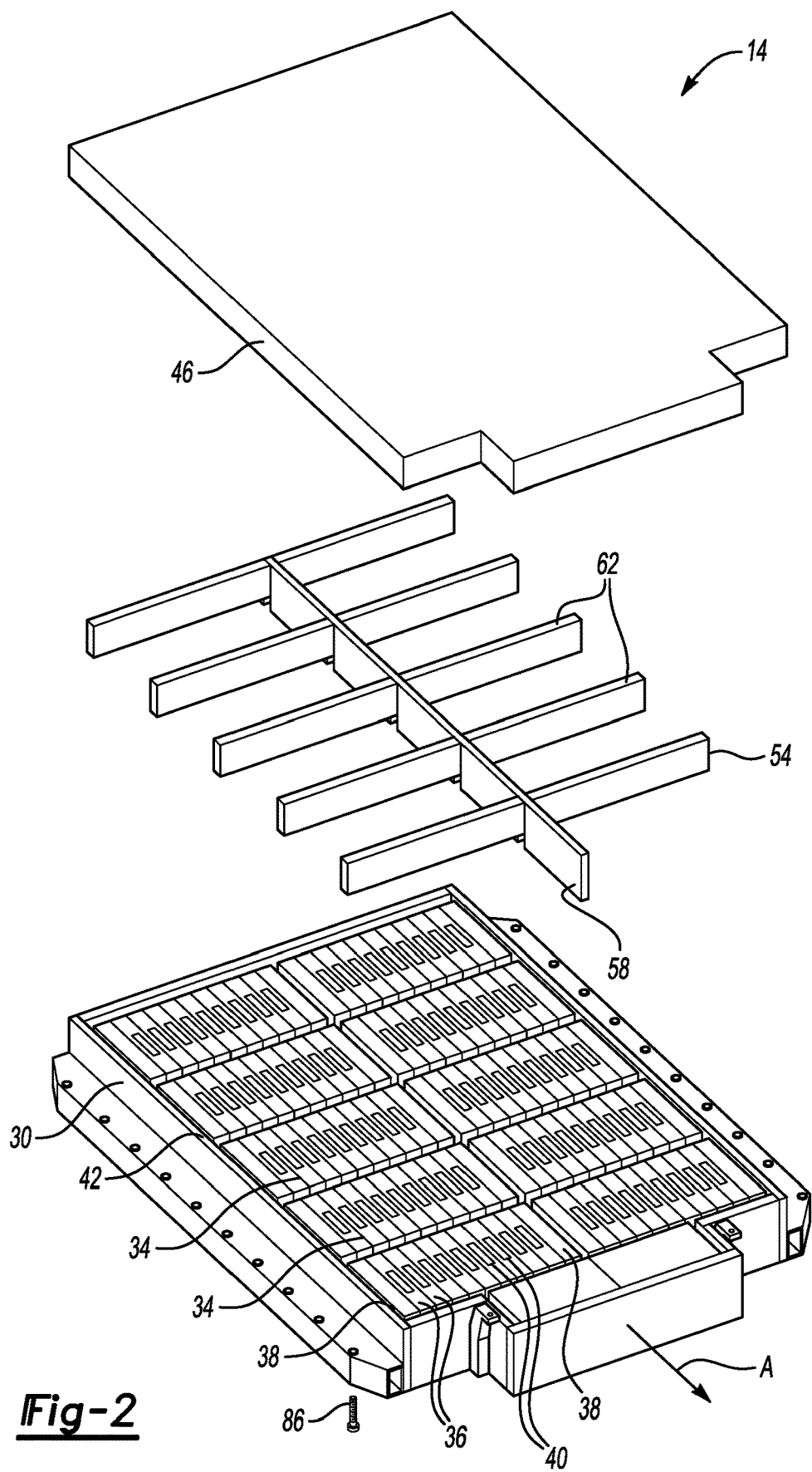
FIG. 2 illustrates a perspective, expanded view of portions of the traction battery pack of FIG. 1.
Figure 3:
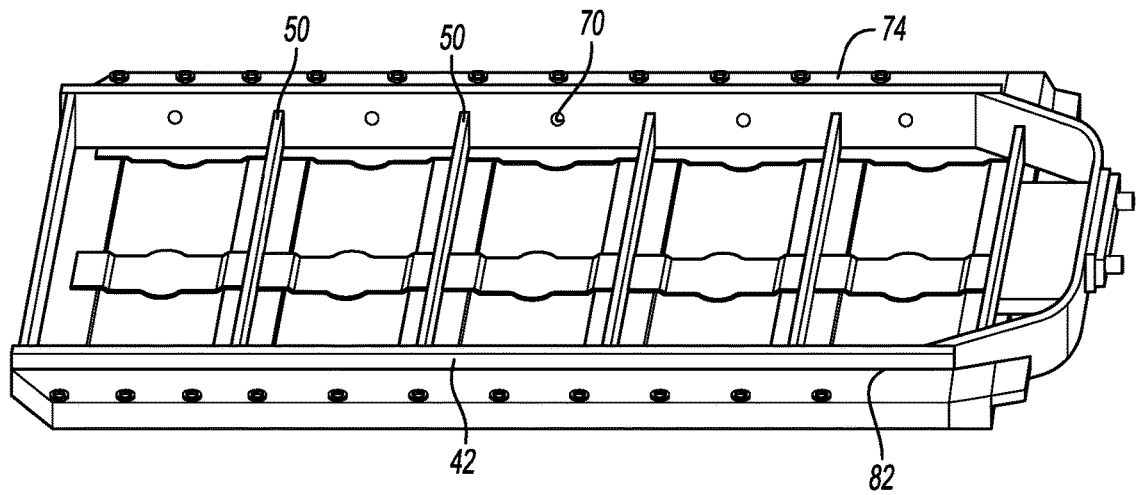
FIG. 3 illustrates a perspective view of a tray from the traction battery pack of FIG. 2.
Figure 4:
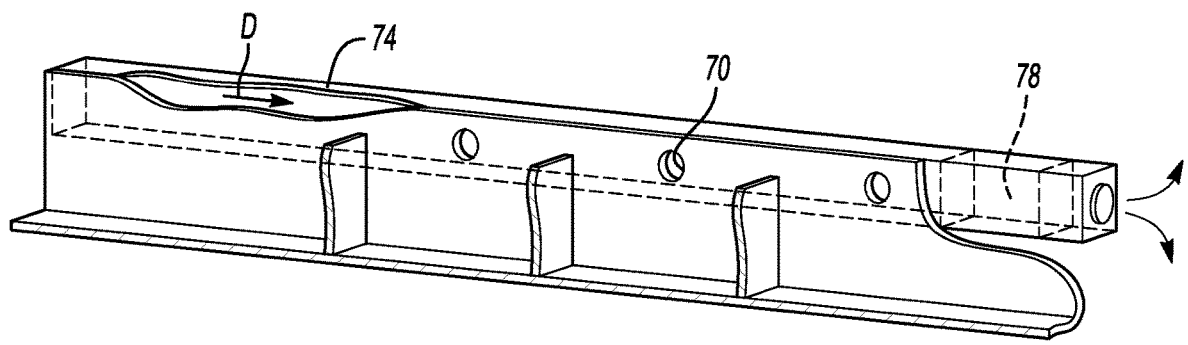
FIG. 4 illustrates a passenger side manifold area of the traction battery pack of FIG. 4.

With reference now to FIGS. 2-4 and continuing reference to FIG. 1, the traction battery pack 14 includes an enclosure 30 that houses a plurality of battery arrays 34. In this example, the enclosure 30 houses ten battery arrays 34. Five of the battery arrays 34 are on a passenger side of the traction battery pack 14. The remaining five battery arrays 34 are on a driver side of the traction battery pack 14.

The individual battery arrays 34 each include a plurality of individual battery cells 36 sandwiched between opposing endplates 38. The individual battery cells 36 each include a vent 40 that is covered by a membrane. A pressure increase within a given one of the battery cells 36 can rupture the membrane of that battery cell 36 so that vented gas can escape.

The enclosure 30 includes a tray 42 and a lid 46. The tray 42 and the lid 46 can be secured to one another to enclose the battery arrays 34 within an interior area of the traction battery pack 14.

The tray 42 incorporates a plurality of cross-members 50. The cross-members 50 are structural cross-members. The cross-members 50, among other things, enhance structural integrity of the tray 42. The cross-members 50 extend in a cross-vehicle direction and are disposed alongside pairs of passenger and driver side battery arrays 34. The cross-members 50 extend from a driver side of the traction battery pack 14 to a passenger side of the traction battery pack 14.

In this example, the traction battery pack 14 includes a divider system to provide a plurality of vented gas receiving compartments within the interior area of the traction battery pack 14. The divider system, in this example includes the cross-members 50, which can be considered structural walls, a non-structural wall assembly 54, and the lid 46. The cross-members 50 can be metal, metal alloy, or polymer based. The assembly 54 can be mica-based, or a composite material that can withstand high temperatures.

The non-structural wall assembly 54 includes a plurality of non-structural walls. One of the non-structural walls is a trunk 58. Other non-structural walls are branches 62 that extend laterally outward from the trunk 58. The trunk 58 is substantially perpendicular to the branches 62 such that the non-structural wall assembly 54 are arranged in a grid pattern.

The trunk 58 extends along a length of the traction battery pack 14 and is parallel to the axis A. When the assembly 54 is installed within the battery pack 14, the trunk 58 rests on the tray 42 and separates the battery arrays 34 on the driver side from the battery arrays 34 on the passenger side. When the assembly 54 is installed, the branches 62 abut the cross-members 50 and rest directly on the cross-members 50. The branches 62 and the cross-members 50 separate the battery arrays 34 from each other along the axis A of the traction battery pack 14.

When assembled, the divider system partitions the interior area of the traction battery pack 14 into a plurality of individual byproduct receiving compartments that are each separate and distinct from the other vented gas receiving compartments. Each of the vented gas receiving compartments is associated with one of the battery arrays 34.

There may be some gaps between neighboring vented gas receiving compartments to allow pressure equalization within the traction battery pack 14 during ordinary operation. These gaps permit only nominal airflow.

The tray includes a plurality of openings 70. Through the openings 70, the vented gas receiving compartments open to an interior of a manifold 74, which extends along a long side of the tray 42.

Gaseous byproducts vented from one of the battery cells 36 move through the vent 40 for that battery cell 36 and are held within the vented gas receiving compartment for the battery module 24 having that battery cell 36. From the vented gas receiving compartment, the vented gases are routed laterally outward through one of the openings 70 into the manifold 74. The vented gases then move in a direction D through the manifold 74. The vented gases are expelled from the manifold 74 into an atmosphere around the electrified vehicle 10. The vented gases could instead move from the manifold 74 to a conduit that communicates the vented gases to a desired area.

In this example, the manifold 74 contains a filtration insert 78. The vented gases can pass through the filtration insert 78 prior to flowing from the manifold 74. The filtration insert 78 can include loose glass fiber or particles to trap particles carried by the vented gas and prevent those particles from exiting the manifold 74. The vented gas can move through a valve from the filtration insert and the manifold 74. The valve can be a pressure valve.

In this example, the manifold 74 is on a passenger side of the traction battery pack 14. The manifold 74 is configured to receive vented gases from the vented gas receiving compartments on the passenger side of the traction battery pack 14.

Another manifold 82, filtration insert, and valve are on a driver side of the traction battery pack 14. The manifold 82 is configured to receive the vented gas from the vented gas receiving compartments on the driver side of the traction battery pack 14.

As the vented gas receiving compartments are each associated with one of the battery arrays 34 in this example, thermal energy of the vented gas is less likely to pass to neighboring modules 34 and raise a temperature of battery cells within those neighboring modules 34 adjacent the battery cell experiencing the venting event. This can help to limit thermal propagation during the venting event.

The manifolds 74 and 82 in this example can receive mechanical fasteners 86 (FIG. 2). The mechanical fasteners 86 can threadably engage the underbody 26 of the electrified vehicle 10 to secure the traction battery pack 14 to the electrified vehicle 10. The manifolds 74 and 82 are thus used as structural members.

Features of the disclosed examples can include individual vented gas receiving compartments for each battery array, and methods of using these compartments to route vented gases from the battery pack without heating up neighboring battery arrays. From the compartments, vented gas can pass directly to a manifold rather than moving toward neighboring battery arrays. A dedicated venting path for each battery array can help to inhibit battery array-to-array thermal propagation.

The compartments can be separated with walls that are at least partially non-structural. The non-structural portion can be mica or similar material.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A traction battery pack venting system, comprising:
a plurality of battery arrays within an enclosure of a traction battery pack, the battery arrays each having a plurality of individual battery cells; and
a divider system within the enclosure, the divider system and the enclosure together providing a plurality of vented gas receiving compartments, each of the vented gas receiving compartments separate and distinct from the other vented gas receiving compartments within the plurality of vented gas receiving compartments, each of the vented gas receiving compartments partially provided by the divider system and partially provided by the enclosure, each of the vented gas receiving compartments associated with one of the battery arrays.

2. The traction battery pack venting system of claim 1, wherein each of the battery arrays includes a pair of endplates that sandwich the plurality of individual battery cells of the respective battery array.

3. The traction battery pack venting system of claim 1, wherein the divider system includes a plurality of non-structural walls.

4. The traction battery pack venting system of claim 3, wherein the plurality of non-structural walls are mica.

5. The traction battery pack venting system of claim 3, wherein the plurality of non-structural walls are arranged in a grid pattern.

6. The traction battery pack venting system of claim 1, wherein the divider system includes a plurality of non-structural walls abutting a plurality of structural walls.

7. The traction battery pack venting system of claim 6, wherein the plurality of structural walls are structural cross-members that extend from a driver side of the traction battery pack to a passenger side of the traction battery pack.

8. The traction battery pack venting system of claim 1, further comprising an enclosure that houses the plurality of battery arrays and the divider system.

9. The traction battery pack venting system of claim 8, further comprising a manifold that extends along a side of the enclosure, wherein at least some of the plurality of vented gas receiving compartments open to the manifold.

10. The traction battery pack venting system of claim 9, further comprising a filtration insert contained within the manifold.

11. The traction battery pack venting system of claim 9, wherein the manifold is a driver side manifold on a driver side of the enclosure, and further comprising a passenger side manifold on a passenger side of the enclosure, wherein the plurality of battery arrays includes a plurality of battery arrays on a driver side and a plurality of battery arrays on a passenger side, the driver side manifold configured to receive vented gas from the vented gas receiving compartments associated with the plurality of battery arrays on the driver side, the passenger side manifold configured to receive vented gas from the vented gas receiving compartments associated with the plurality of battery arrays on the passenger side.

12. A traction battery pack venting system, comprising:
a plurality of battery arrays within a traction battery pack, the battery arrays each having a plurality of individual battery cells; and
a divider system that provides a plurality of vented gas receiving compartments, each of the vented gas receiving compartments separate and distinct from the other vented gas receiving compartments within the plurality of vented gas receiving compartments, each of the vented gas receiving compartments associated with one of the battery arrays,
wherein the manifold is a driver side manifold on a driver side of the enclosure, and further comprising a passenger side manifold on a passenger side of the enclosure, wherein the plurality of battery arrays includes a plurality of battery arrays on a driver side and a plurality of battery arrays on a passenger side, the driver side manifold configured to receive vented gas from the vented gas receiving compartments associated with the plurality of battery arrays on the driver side, the passenger side manifold configured to receive vented gas from the vented gas receiving compartments associated with the plurality of battery arrays on the passenger side, wherein the passenger side manifold and the driver side manifold are configured to secure rails of an electrified vehicle to secure the traction battery pack to the electrified vehicle.

13. A traction battery pack venting method, comprising: incorporating a divider system into an enclosure of a traction battery pack to provide a plurality of vented gas receiving compartments within the traction battery pack, each of the vented gas receiving compartments separate and distinct from the other vented gas receiving compartments within the plurality of vented gas receiving compartments, each of the vented gas receiving compartments partially provided by the divider system and partially provided by the enclosure, each of the vented gas receiving compartments associated with a battery array of the traction battery pack.

14. The traction battery pack venting method of claim 13, wherein each of the battery arrays includes a pair of endplates that sandwich a plurality of individual battery cells of the respective battery array.

15. The traction battery pack venting method of claim 13, wherein the divider system includes a plurality of non-structural walls abutting a plurality of structural walls.

16. The traction battery pack venting method of claim 13, further comprising routing vented gas from the vented gas receiving compartments into a manifold that extends along a side of the traction battery pack.

17. The traction battery pack venting method of claim 16, further comprising routing vented gas through a filtration insert held within the manifold.

18. The traction battery pack venting method of claim 16, further comprising securing the traction battery pack to a rail of an electrified vehicle through the manifold.

19. The traction battery pack venting method of claim 16, further comprising routing vented gas from the vented gas receiving compartment through an opening in an enclosure of the traction battery pack.

* * * * *